United States Patent Office 3,450,614
Patented June 17, 1969

3,450,614
VINYL GRAFT COPOLYMERIZATION WITH A POLYURETHANE SUBSTRATE IN THE PRESENCE OF ULTRA-VIOLET LIGHT
Robert W. Faessinger, Media, and John S. Conte, Ridley Park, Pa., assignors to Scott Paper Company, Philadelphia, Pa., a corporation of Pennsylvania
No Drawing. Filed Oct. 13, 1965, Ser. No. 495,699
Int. Cl. B01j 1/10; C08f 1/18
U.S. Cl. 204—159.15        6 Claims

ABSTRACT OF THE DISCLOSURE

Hydrophilic graft copolymers of polyurethane foam are produced by mixing (a) a sufficient amount of a photoiniator, such as benzophenone, with (b) a polyurethane starting material, foaming said mixture, and reacting said foam with (c) an ethylenically unsaturated polymerizable material, such as an acrylic monomer, in the presence of a sufficient amount of ultra-violet radiation to graft copolymerize the foam and ethylenically unsaturated monomer.

---

This invention relates to a process for preparing hydrophilic polyurethane foams and to the products obtained by this method. More particularly, this invention relates to the modification of porous polyurethane foams by novel graft polymerizing techniques to obtain open-like foams having a high degree of hydrophilicity.

Porous polyurethanes, as known in the prior art, can be classified in three groups based on their cellular structure. First, completely closed cell structures are those with no intercommunication beyond a few adjacent cells. In this form the membranes can cover essentially all of the faces. A second group of polyurethanes consists of open-celled types where the cells are in intercommunicating relationship with each other and substantially all of the cells have passageways to other cells in the foam body. Three-dimensionally reticulated polyurethane structures make up the third type of polyurethane foam. Although a reticulated structure is not really a foam, as all or substantially all of the membranes have been removed, this foam-derived structure is often referred to as a reticulated polyurethane foam. An appropriate description of the last two groups of foam is found in Volz U.S. Patent 3,171,820.

Based on physical properties, polyurethanes may be conveniently classified in three groups: rigid, semi-rigid and flexible. An appropriate description of the three kinds of foams can be found in Saunders et al., Polyurethanes Chemistry, Part I (1962) and Part II (1964), New York: Interscience Publishers.

Most polyurethanes are either of the ester, the ether or polyether amine type. Of these, the polyester and polyether urethanes are preferred. As a general rule, nearly all of the commercially important and chemically and physically outstanding foams are hydrophobic.

Thus, the present invention addresses itself to the problem of overcoming the hydrophobic nature of polyurethane foams and especially to the improvement of the hydrophilicity of polyether and polyester polyurethane foams such as illustrated in the above Volz patent.

Of the above polyurethane classes the present invention concerns the flexible and semi-rigid foams that are open celled and, preferably, the reticulated kind. In the prior art, various attempts have been made to coat the cellular products with various hydrophilic coatings. A method which has been used in treating prior-art reticulated polyurethane foams involves causing the polyurethane to imbibe by swelling, a polymerization initiator and then graft copolymerizing the polyurethane and a monomer which imparts hydrophilic properties to polyurethane.

Another hydrophilic polyurethane foam product has been made by adding polyacrolein to the foam and further reacting the polyacrolein to continue condensation of it, preferably, in the presence of sulfur dioxide.

Still another means of rendering polyurethane hydrophilic consists of coating the membranes and the polyurethane strands and nexus with aluminum sulfate or aqueous sol of fibrous boehmite. Most of these products have been open celled products. Reticulated foams have been treated by various methods such as those disclosed in Powers et al. U.S. Patent 2,900,278. However, the present invention is directed to an improved method over the process described in Powers et al.

Still another prior art graft process used in treating polyurethanes has involved high-energy, radiation-initiated polymerization. Needless to say, these radioactive systems are highly dangerous and require elaborate precautions and complicated apparatus to protect the environment from dangerous radiation.

In the polyurethane foam reaction wherein the polyester and polyether etc. resin is reacted with a polyisocyanate in presence of suitable catalysts and water, exothermic reaction(s) takes place. After the curing the open-celled polyurethane may further be subjected to either the alkali type of reticulation illustrated in the above Volz patent or the explosive or flame reticulation similarly illustrated in the Volz patent. Not only the foam reaction but also the reticulation step is conducted at elevated temperature.

In order to simplify graft polymerization techniques such as those found in the prior art, it has now been found that by incorporating a specific polymerization initiator which survives either the foaming reaction or the reticulation reaction, a simplified grafting sequence can be achieved producing results heretofore requiring an excessive number of steps of poor yields.

A number of polymerization initiators are known. However, the problem in polyurethane foaming environment consists of finding an initiator that will be compatible with the reactants such as the polyethers, polyesters and polyisocyanates, as well as the catalysts employed in the process. Moreover, when polyurethane foam containing the polymerization initiator is subjected to reticulation processes, the polymerization initator must survive the alkali attack, the neutralization reaction and, in the more drastic instance, the flame treatment.

It has now been found that, by incorporating into a polyurethane resin mixture an initiator such as benzophenone, the prior art polyurethane coating techniques can be improved and graft copolymerization initiated by means of ultra-violet energy applications. Ultraviolet light suitable for use in this invention includes light with wave lengths in the range of 1500–4000 A. but the preferred range for more effective grafting is 2000–3800 A. and wave lengths of 2500–3500 A. for most efficient grafting.

Ultraviolet light suitable for use in this invention is characterized by a radiation intensity of at least $4 \times 10^{-3}$ watts/cm.$^2$ of plane surface upon which effective radiation impinges. Light with lower radition intensity than this fails to cause grafting within a practical length of time.

Although there are a number of graft initiators, most of these have proven unsuitable in polyurethane grafting work. Suitable photoinitiators for use in this invention include, 2,3-octanedione, 1-phenyl-1,2-butanedione, 2,2-dimethyl-4-phenyl 3,4-butanedione, diphenyl triketone, anthraquinone benzoin methyl ether, benzoin ethyl ether, dinaphthyl ketone, benzophenone and the like. Because of its peculiar nature, benzophenone appears to be especially suitable in the novel process. The amount of photoinitiator may be suitably varied from 0.01% to 10% of the weight of the polyurethane. However, amounts above and below this range may be employed under special circumstances. Additionally, the present system offers advantages because of reproducible results, capability of initiating polymerization reactions with a wide range of monomers and ease of operating control.

Among the suitable monomers which may be used in the process of the present invention are the water-soluble and water-miscible unsaturated monomers such as acrylic acid, hydroxy-ethyl acrylate, acrylamide, acrylonitrile, dimethylaminoethyl methacrylate. Mixtures of the foregoing monomers may be employed such as various ratios of acrylic acid with hydroxyethyl acrylate and dimethylaminoethyl methacrylate with acrylic acid. Other monomers which may be used are methacrylamide, polyethylene glycol acrylates and methacrylates, analogous derivatives of chloracrylic acid and cyanoacrylic acid, ethacrylic acid, monoesters of maleic and fumaric esters with ethylene and polyethylene glycols. Still other suitable monomers which can be polymerized and substituted for the aforementioned preferred monomers are those having properties obvious to persons with ordinary skill in the art.

The amount of monomer present in the polymerization system may vary widely. It has been found that the percentage of graft pickup by the foam may vary from 5% or lower to 100% and higher. The amount of pickup can be favored by an increase in the concentration of monomer in the polymerization system or operating at a given ratio of monomer-to-foam. With the foregoing consideration in mind, it has been found that the concentration of monomer may vary from about 1% to about 15% or higher by weight of the polymerization medium and ratio of monomer-to-foam may suitably be about 1.5 to 1 part by weight. Other concentrations and ratios of monomer-to-foam may be used.

The following examples are illustrative of this invention but are not to be construed as limiting the broader concept thereof:

EXAMPLE 1

A polyurethane foam was prepared from 35.09 parts of ET 3000 (polyether, propylene oxide adduct of glycerine), 0.2 part of Dabco (1,4-diazobicyclo 2,2,2-octane), 1.0 part of water, 0.35 part L 502 (alkyl silane polyoxyalkylene copolymer) and 1.0 part of benzophenone dissolved in 13.3 parts of toluene diisocyanate. The foam was then reticulated by the methods disclosed in U.S. Patent 3,171,820 and sliced into sheets and pressed in an aqueous solution containing 10% of acrylic acid and exposed to ultra-violet radiation for about one hour. The weight of the sheet before exposure was 1.20 parts and, after exposure, 2.75 parts. The ultra-violet source was Hanovia Lamp No. 30600 operated at 115 volts, 60 cycles, 140 watts.

EXAMPLE 2

The same foam as used in the previous example was exposed to an acrylamide. The weight of the foam sheet was 1.250 before polymerization and 2.707 after polymerization.

EXAMPLE 3

By following the same procedure as in Example 1 the same foam was exposed to acrylonitrile. The weight of the sheet before copolymerization was 1.20 and after copolymerization, 1.39.

The products of this invention are useful as household sponges or they can be converted to an appropriate ion-exchange resin via an amine. These ion-exchange foams can then be used for various purposes well known in the art.

Hydrophilicity is measured herein as follows: a block of the cellular mass to be tested is squeezed several times under water. The block is withdrawn and excess water is removed but manually squeezed and the weight of the wet squeezed block is noted. 30 mm. of water are poured onto a flat sheet of polystyrene to make a puddle. The block is gently placed on the puddle for a period of five seconds. Again, the block is weighted. Water absorbed is calculated as percentage of the original 30 mm. The foams treated according to this method exhibited superior hydrophilicity when compared to the foams prepared by the prior art methods.

What is claimed is:
1. A process for graft copolymerizing an ethylenically unsaturated monomer which is hydrophilic in its copolymerized state with a polyurethane material, the process comprising the steps of:
   incorporating at least one photoinitiator selected from the class consisting of benzophenone, 2,3-octanedione, 1 - phenyl - 1,2-butanedione, 2,2-dimethyl-4-phenyl-3,4-butanedione, diphenyl triketone, anthraquinone, benzoin methyl ether, benzoin ethyl ether, and dinaphthyl ketone in a polyurethane starting material,
   forming a polyurethane foam from said polyurethane starting material containing said photoinitiator,
   contacting said polyurethane foam with at least one ethylenically unsaturated monomer selected from the class consisting of acrylic acid, hydroxyethylacrylate, acrylamide acrylonitrile, dimethylaminoethylmethacrylate, methacylamide, polyethylene glycol acrylate, polyethylene glycol methacrylate, polyethylene glycol chloroacrylate, polyethylene glycol cyanoacrylate, ethacrylic acid, the monoester of maleic acid and ethylene glycol, the monoester of maleic acid and polyethylene glycol, the monoester of fumaric acid and ethylene glycol, and the monoester of fumaric acid and polyethylene glycol, and
   initiating a graft copolymerization reaction between the urethane foam and the ethylenically unsaturated monomer by exposing the polyurethane foam in contact with the ethylenically unsaturated monomer to an ultra-violet light source sufficient to provide a radiation intensity of at least $4 \times 10^{-3}$ watts per square centimeter of plane surface upon which effective radiation impinges.

2. The process according to claim 1 wherein the polyurethane foam is reticulated prior to being contacted with the ethylenically unsaturated monomer.

3. The process according to claim 1 wherein benzophenone is incorporated in the polyurethane starting material.

4. The process according to claim 3 wherein the ethylenically unsaturated monomer which is employed is acrylic acid.

5. The process according to claim 3 wherein the ethylenically unsaturated monomer which is employed is acrylamide.

6. The process according to claim 3 wherein the ethylenically unsaturated monomer which is employed is acrylonitrile.

References Cited

UNITED STATES PATENTS

| | | | |
|---|---|---|---|
| 2,577,279 | 12/1951 | Simon et al. | 260—2.5 |
| 3,090,664 | 5/1963 | Cline et al. | 204—159.15 |
| 3,382,090 | 5/1968 | Meisel et al. | 117—98 |

MURRAY TILLMAN, *Primary Examiner.*

R. B. TURER, *Assistant Examiner.*

U.S. Cl. X.R.

204—159.23; 260—77.5